US005637152A

United States Patent [19]
Robinson et al.

[11] Patent Number: 5,637,152
[45] Date of Patent: Jun. 10, 1997

[54] SOIL WASHING APPARATUS AND METHOD

[75] Inventors: Forrest L. Robinson, Mission; Willis R. Campbell, Olathe, both of Kans.

[73] Assignee: Separation Oil Services, Inc., Mission, Kans.

[21] Appl. No.: 412,897

[22] Filed: Mar. 29, 1995

Related U.S. Application Data

[60] Continuation-in-part of Ser. No. 226,754, Apr. 12, 1994, Pat. No. 5,423,340, which is a division of Ser. No. 880,141, May 7, 1992, Pat. No. 5,316,029.

[51] Int. Cl.⁶ ....................................................... B08B 3/12
[52] U.S. Cl. .............................. 134/12; 134/109; 134/65; 134/61; 134/66; 134/134; 134/132; 134/105
[58] Field of Search ............................. 134/111, 65, 132, 134/109, 105, 131, 61, 66, 133, 134, 10, 12; 405/128

[56] References Cited

U.S. PATENT DOCUMENTS

| | | |
|---|---|---|
| 3,145 | 10/1843 | Huto . |
| 122,277 | 12/1871 | Perecoy . |
| 544,080 | 8/1895 | Bachmann . |
| 726,948 | 5/1903 | Land . |
| 957,250 | 5/1910 | Ponten . |
| 1,043,947 | 11/1912 | Maassen . |
| 1,724,254 | 4/1929 | Buckbee . |
| 1,755,841 | 5/1930 | Sandstorm . |
| 1,828,435 | 8/1931 | Otte . |
| 1,828,546 | 11/1931 | Sandstorm . |
| 2,240,841 | 5/1941 | Flynn ........................................ 366/307 |
| 2,249,653 | 8/1941 | Harstick . |
| 2,252,373 | 1/1941 | Harstick . |
| 2,259,088 | 4/1941 | Sheehan et al. . |
| 2,290,237 | 11/1942 | Harstick . |
| 2,330,508 | 9/1943 | McCall . |
| 2,554,109 | 5/1951 | Langhurst ................................ 366/307 |
| 2,808,200 | 3/1957 | Wishaw . |
| 3,464,554 | 9/1969 | Laut . |
| 3,556,301 | 1/1971 | Smith . |
| 3,578,171 | 5/1971 | Usher . |
| 3,630,432 | 12/1971 | Murkes . |
| 3,703,984 | 11/1972 | Pruessner . |
| 3,901,254 | 8/1975 | Stearns et al. . |
| 4,111,809 | 9/1978 | Pichon . |
| 4,132,010 | 1/1979 | Deland . |
| 4,175,040 | 11/1979 | Sammons et al. . |
| 4,175,873 | 11/1979 | Iwako et al. . |
| 4,281,605 | 8/1981 | Uemura et al. . |
| 4,491,517 | 1/1985 | Janovac . |
| 4,501,671 | 2/1985 | Bazell . |
| 4,519,848 | 5/1985 | Underwood ............................. 134/182 |
| 4,525,155 | 6/1985 | Nilson . |
| 4,546,783 | 10/1985 | Lott . |
| 4,635,664 | 1/1987 | Theurer et al. . |
| 4,797,210 | 1/1989 | Lunardo . |
| 4,897,221 | 1/1990 | Manchak, Jr. .......................... 405/128 |
| 4,927,293 | 5/1990 | Campbell . |
| 5,003,813 | 4/1991 | Hayes . |
| 5,024,770 | 6/1991 | Boyd et al. . |
| 5,032,275 | 7/1991 | Thew . |

(List continued on next page.)

FOREIGN PATENT DOCUMENTS

| | | |
|---|---|---|
| 10614 | 10/1901 | Denmark . |
| 292976 | 7/1916 | Germany . |
| 452363 | 12/1974 | U.S.S.R. . |
| 1214216 | 6/1984 | U.S.S.R. . |
| 337628 | 11/1930 | United Kingdom . |

*Primary Examiner*—Frankie L. Stinson
*Attorney, Agent, or Firm*—Head, Johnson & Kachigian

[57] ABSTRACT

An apparatus and method for removing hydrocarbons from soil is disclosed. A gradient force machine pulverizes contaminated soils, which are then mixed with release agents in a mixing tank. A water-filled separation unit receives the mixed soil, the unit having a plurality of counter-rotating augers to aid in the breakdown of the mixed soil to solid, water and hydrocarbon components. A washing container receives the solid component from the separation unit, the container having a diagonally-disposed, enclosed auger for outputting a washed solid component. Hydrocarbons that have floated to the top of the separation unit and washing container are removed by a vacuum system.

19 Claims, 2 Drawing Sheets

U.S. PATENT DOCUMENTS

| | | |
|---|---|---|
| 5,039,415 | 8/1991 | Smith . |
| 5,090,498 | 2/1992 | Hamill . |
| 5,107,874 | 4/1992 | Flanigan et al. . |
| 5,141,632 | 8/1992 | Calcha . |
| 5,151,835 | 9/1992 | DeMichael . |
| 5,236,132 | 8/1993 | Rowley, Jr. . |
| 5,242,246 | 9/1993 | Manchak, Jr. III ............... 405/128 |
| 5,265,977 | 11/1993 | Weurich et al. . |
| 5,295,761 | 3/1994 | Heacock et al. . |
| 5,316,029 | 5/1994 | Campbell et al. . |
| 5,340,467 | 8/1994 | Gergoli et al. . |
| 5,344,255 | 9/1994 | Toor ............................... 134/109 |
| 5,368,411 | 11/1994 | Losack . |
| 5,413,129 | 5/1995 | Shenoi ............................ 134/65 |
| 5,423,340 | 6/1995 | Campbell et al. . |

SOIL WASHING APPARATUS AND METHOD

CROSS REFERENCE TO RELATED APPLICATIONS

This application is a continuation-in-part of U.S. application Ser. No. 08/226,754, filed Apr. 12, 1994, now U.S. Pat. No. 5,423,340, which is itself a divisional application of U.S. application Ser. No. 07/880,141, filed May 7, 1992, now U.S. Pat. No. 5,316,029, issued May 31, 1994.

BACKGROUND OF THE INVENTION

1. Technical Field

The present invention relates generally to the cleansing of contaminated soils, and, more particularly, to an apparatus and method for removing hydrocarbons from soils.

2. Background

Oil is a complex mixture of hydrocarbons and small amounts of other substances and is found in many places in the upper strata of the earth. Wells are drilled for these deposits and oil is produced. There are elaborate transport systems for the oil, including pipelines, that criss-cross the country. Transport systems also include huge ocean-going oil tankers for carrying the oil. It is inevitable that there will be an occasional spill or leakage of oil onto water or land. The oil spilled onto land directly contaminates the land, while the oil spilled onto water usually washes ashore contaminating beach areas. One of the most well known oil spills is the Kuwait oil disaster created during the course of the Persian Gulf War in 1991.

Efforts have been made to limit the damage of oil spills to the environment, it being necessary to clean-up oil spills as expeditiously as possible. The invention disclosed and claimed herein includes an apparatus and method for removing hydrocarbons from soils contaminated by such spills. The invention may be practiced at the spill site, immediately returning cleaned soil to the environment.

SUMMARY OF THE INVENTION

There are many sources and means for obtaining hydrocarbon-containing, or contaminated, soils. One such source is generated where oil has been spilled over a large area of earth. In one source recovery system, precasted concrete panels are placed upright in a trench in the ground with the top of the panels sticking out a sufficient distance to allow flooding of the earth in the fenced off area. The oil and water within the enclosed area, along with a portion of soil, are floated from the earth. The soil, water and oil solution is transported by the use of pipes and pumps to a storage area.

Another means of obtaining hydrocarbon-containing soils includes the use of augers or draglines that pull the oil-layden earth toward and onto a conveyor system of belts for transportation to a collection tank.

It is an object of this invention to provide an apparatus for removing hydrocarbons from collected, contaminated soil, the apparatus being of a transportable and easily erected construction, such that it may be employed at or adjacent to a spill site to facilitate the expeditious management of the environmental clean-up.

It is a further object of this invention to provide a method for removing hydrocarbons from contaminated soils, which method can be carried out at the contamination site using transportable, easily-operated machinery.

These and other objects are achieved through Applicant's apparatus and method for removing hydrocarbons from soil.

The apparatus includes a means for pulverizing hydrocarbon-containing soils to obtain pulverized soils. A means is also provided for mixing the pulverized soils with release agents to obtain a light paste. A water-filled separation unit for receiving the paste is part-in-parcel to the apparatus, the unit having a plurality of counter-rotating augers to aid in the breakdown of the paste to solid, water and hydrocarbon components. One of the augers of the separation unit is adapted to convey the solid component from the separation unit to a water-filled washing container. This container has a diagonally-disposed, enclosed auger for conveying the solid component through the water and from the container to obtain a washed solid component. The hydrocarbons that are released from the contaminated soil float to the tops of the separation unit and washing container where they are removed.

In the method for removing hydrocarbons from soil, the hydrocarbon-containing soils are pulverized to obtain pulverized soils, which are mixed with release agents to obtain a light paste. This light paste is passed to a water-filled separation unit where solid, water and hydrocarbon components are obtained. The solid component is washed in a washing container with water such that a washed solid component is obtained. The hydrocarbons having floated to the tops of the separation unit and washing container are then removed for disposal.

A better understanding of the invention may be had from the following description taken in conjunction with the attached drawings.

DETAILED DESCRIPTION OF THE PREFERRED EMBODIMENTS

Figure 1A:
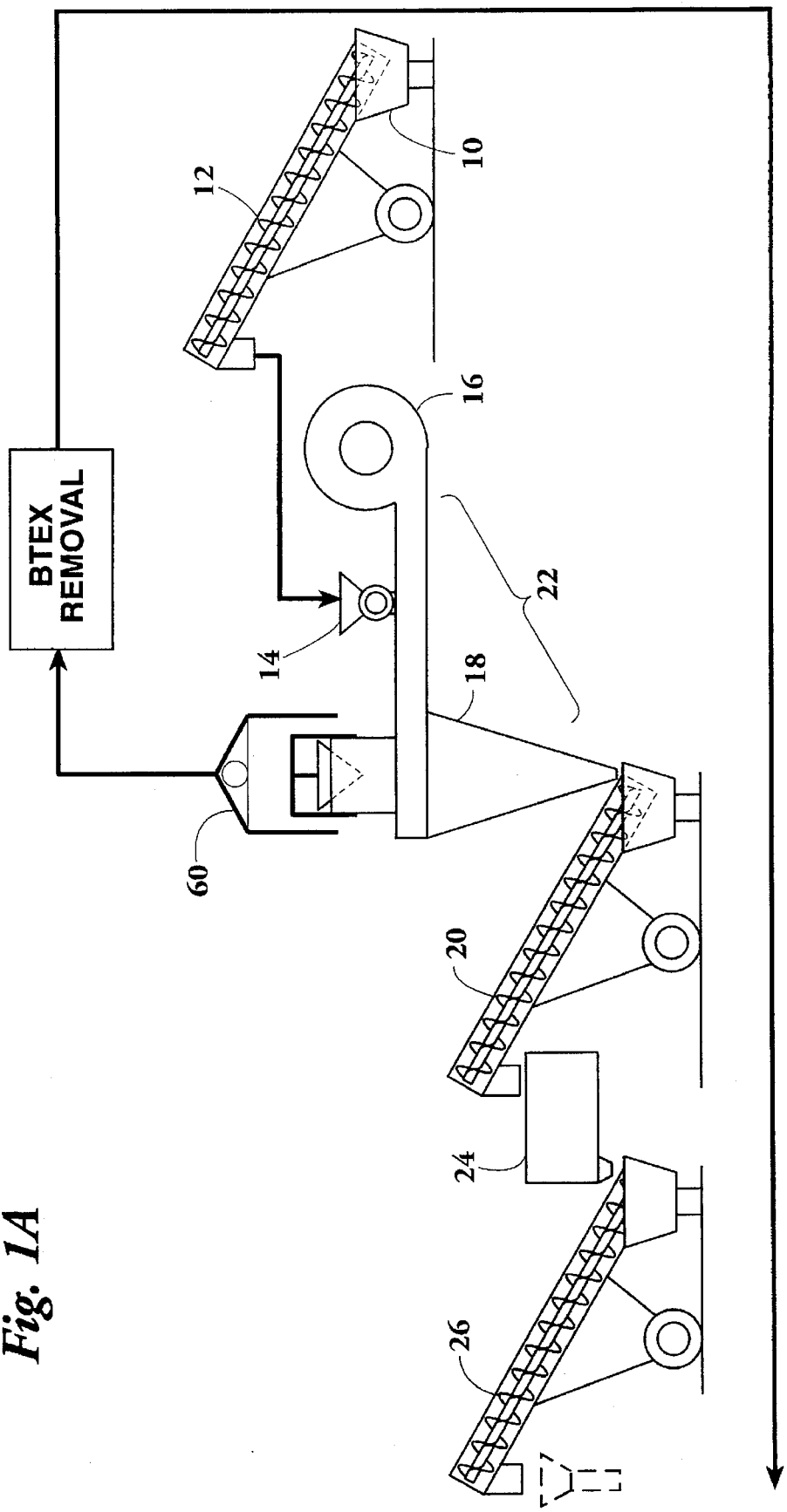
FIGS. 1A and 1B illustrate the preferred embodiment of Applicant's apparatus and method for removing hydrocarbons from soil.

Referring now to FIG. 1A, reference numeral 10 indicates a source of contaminated, hydrocarbon-containing soils. The source soil may be obtained in a variety of ways, including but not limited to the two methods described above, i.e. by floatation from the earth or by the use of augers or draglines. From source 10 the hydrocarbon-containing soils are moved via first elevator 12 to an airlock 14. A motor driven fan 16 provides a high volume of air with an extreme velocity to pulverize the hydrocarbon-containing soils introduced to the air stream by way of airlock 14. The item identified by reference numeral 18 includes an adjustable cone to control the amount of escaping air as generated by motor driven fan 16 and to adjust the fineness of the material exiting the bottom of the cone into a second elevator 20. Taken together in combination, motor driven fan 16, airlock 14 and item 18 comprise a gradient force machine 22. Gradient force machines are well known in the art, one particular such machine being described in U.S. Pat. No. 5,236,132. This type of machine may also be described as a cyclonic comminuter/dehydrator. Thus, the term "gradient force machine" as used herein should also be taken to mean a cyclonic comminuter/dehydrator. It is not the intent of Applicant to disclose and claim the gradient force machine 22, but to incorporate it into a soil washing apparatus and method as a means of pulverizing the soil to fine enough particles such that the hydrocarbons contained in the soil are made to have a surface tension that facilitates their release from the soil.

The pulverized, hydrocarbon-containing soils exiting the bottom of the gradient force machine are preferably not as fine as flour, but more the consistency of granulated sugar or slightly finer.

In the ensuing description it is assumed that the soil being used is clay, as this is the most difficult soil type to work with. Sandy soil or sand with rocks will require less of the steps being described.

As the pulverized soils exit gradient force machine 22, they are taken by second elevator 20 and deposited into a mixing tank 24. Mixing tank 24 may include an interior mixing auger or other common, well known mixing assemblies. The pulverized soils deposited in mixing tank 24 are blended therein with a release agent. Release agents function to further facilitate the disassociation of hydrocarbons from the pulverized soils and are known in the art. Common release agents include TLS2000 or a biodegradable mixture of sodium metasilicate, butoxyethanol, or cocoamide. The release agent is mixed with the pulverized soils in such a way as to obtain a light paste. The amount of release agent required depends on the basic type of soil being processed. For example, clay material requires more release agent than does sand. A typical mixture of release agent would be up to 2 ounces of TLS2000 to 3 lbs. of contaminated soil.

After the pulverized soils and release agent are mixed thoroughly in mixing tank 24, the light paste obtained is deposited into a third elevator 26. Elevator 26 is preferably an auger-type elevator which functions to further mix the release agent and the pulverized soils during transportation to separation unit 28.

With some types of soil, mixing tank 24 can be bypassed with the mixing of the pulverized soils and release agents taking place solely in second elevator 20. In such a situation, second elevator 20 would then deposit the light paste obtained through the mixing process directly into separation unit 28.

Figure 1B:
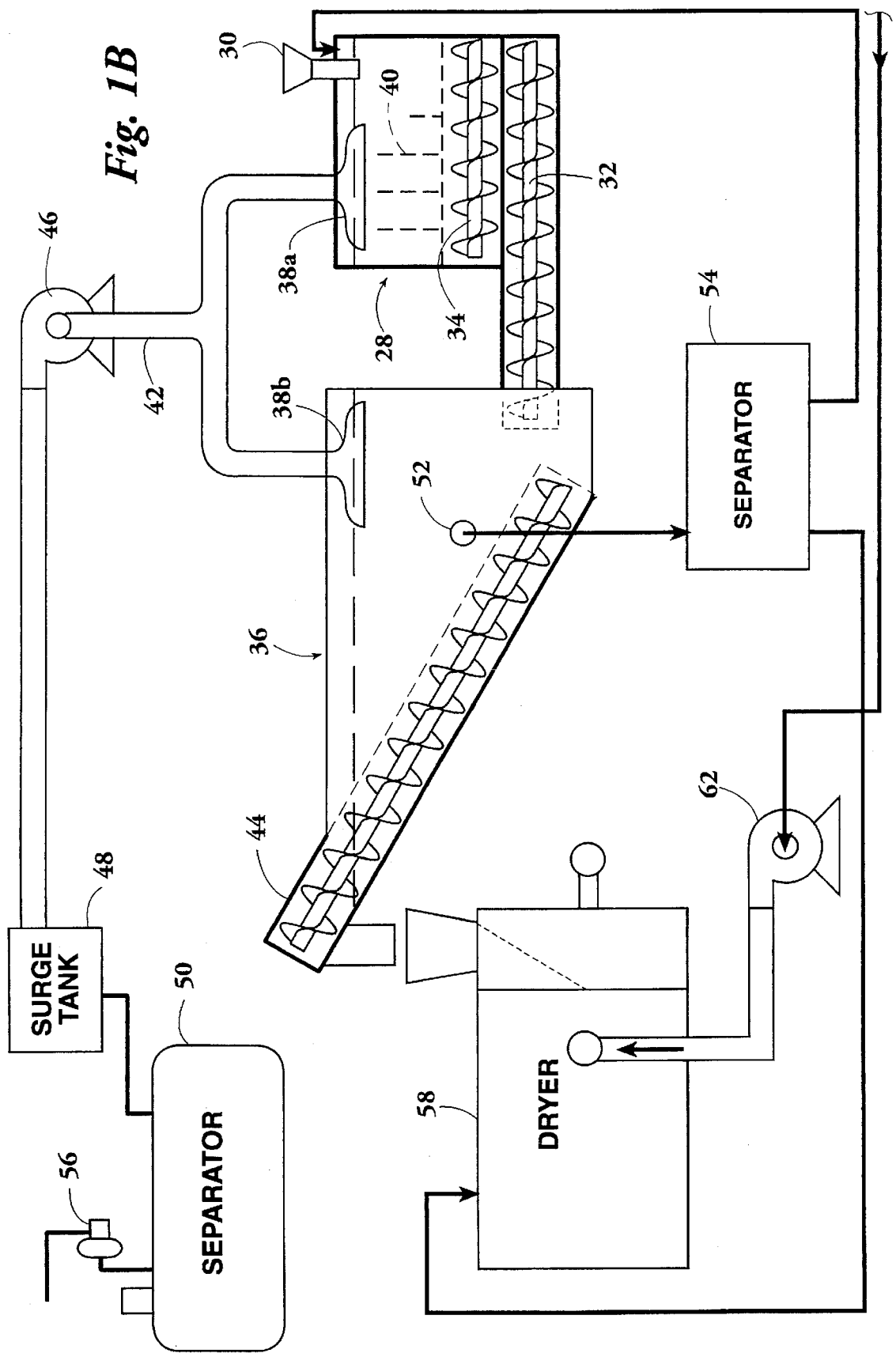

Separation unit 28 is where most of the hydrocarbons are separated from the contaminated soils. The mixed soils and release agents are added to separation unit 28 in their previously described form as a light paste. The inlet to separation unit 28 is indicated in FIG. 1B as inlet 30. Separation unit 28 is a water-filled unit containing a plurality of counter-rotating augers. In the embodiment identified in FIG. 1B, auger 32 is running in a direction so as to move sediment across the bottom of separation unit 28 toward a washing container 36. Auger 34 on the other hand is counter-rotating to auger 32, causing a cross current. The counter-rotating augers 32, 34 serve to expose the particles of contaminated soil to the water, acting as horizontal agitators to catalyze the release of hydrocarbons. The cross currents provided by counter-rotating augers 32, 34 serve to further wash the soil in suspension in the water. The top auger 34 also acts as a means to set up cross currents near the top of separation unit 28 in a manner which tends to collect the released hydrocarbons closer to a vacuum wand 38 and away from inlet 30. Baffles 40 are positioned above counter-rotating augers 32, 34 and facilitate the collection of released hydrocarbons around the area covered by a vacuum wand 38a.

Vacuum wand 38a is connected to a flexible hose 42. Vacuum wand 38a can be guided when necessary to collect the released hydrocarbons floating in separation unit 28.

In separation unit 28 the hydrocarbon-containing soils are broken down into three basic components, i.e. solid, water, and hydrocarbon components. As previously discussed, the hydrocarbon component floats to the top of water-filled separation unit 28 to be removed by vacuum wand 38a. The water component, of course, is retained within separation unit 28. The solid component, however, is transported by auger 32 to washing container 36. Washing container 36 is also water filled.

The solid component deposited in washing container 36 is elevated through and out of washing container 36 by a diagonally-disposed, enclosed auger 44. Vacuum wand 38b extends into washing container 36 and removes any additional hydrocarbons released as the solid component traverses washing container 36 by way of enclosed auger 44.

Pump 46 creates a vacuum in vacuum wands 38a–b and their associated hose or piping 42 and causes the removed hydrocarbons to be transported to a surge tank 48 for storage. In certain soils like clay, it will be necessary to further separate the vacuumed material in a horizontal separator 50, as some of the solid component and hydrocarbons are in solution. The horizontal separator 50 allows for the separation of the solid, water and hydrocarbon components over time based upon their densities. A vertical separator (not shown) can also be used for this process.

If the soil is of a type that is accommodating, enclosed auger 44 may be bypassed by the use of a mud pump 52 located in the bottom of washing container 36. Mud pump 52 may be directly connected to a second horizontal separator 54. Horizontal separator 54 functions in the same manner as horizontal separator 50. In fact, if it is desired that only one horizontal separator be used, such separator may have two inlets, one from surge tank 48 and the other from mud pump 52, thus eliminating the need for a second horizontal separator.

Pump and piping 56 serve to carry the released hydrocarbons away from horizontal separator 50. Pump and pipe 56 could also be connected to surge tank 48 if desired.

The washed solid component exiting enclosed auger 44 may still have a slight amount of hydrocarbons left in it, even though the level is probably below present EPA standards. Also, the solid component has a high moisture content owing to water saturation from separation unit 28 and washing container 36. Enclosed auger 44 is designed to allow pumping of the soil component only, thus keeping a large volume of water from exiting its top end. The solid component exiting enclosed auger 44 is deposited into dryer 58.

The purpose of dryer 58 is to remove any small amount of hydrocarbons remaining in the solid component and to dry the solid component to an optimum moisture level for reintroduction into the ground at the clean-up site. Preferably the dried solid component, i.e. cleaned soil, has about a 30% moisture content. Dryer 58 may be gas powered, in which case released hydrocarbons captured by a cupola 60 placed above the gradient force machine 22 can be used to power dryer 58. Gas pump 62 and its associated piping may be used to convey released hydrocarbons captured by cupola 60 to dryer 58. Dryer 58 is preferably a rotating type furnace. The burning of these released hydrocarbons gases will change their structure so as not to be detrimental to the atmosphere when coupled with a smoke scrubber. Output from dryer 58 is cleaned soil which can be placed back into the ground. Again, there are some soils, such as sand, where the drying step may not be necessary.

Other options made available with Applicant's apparatus include the recirculation of solid component from enclosed auger 44 back into airlock 14 for a second round of cleaning. Further, as stated above, mixing tank 24 will not always be necessary. In such instances second elevator 20 can be said to be a mixing auger as well as a conveying auger, with release agents being added directly to elevator 20. Elevator 20 would then convey the pulverized soils and release agents to separation unit 28. Still further, cupola 60 can be a scrubber for removing gasses and separating out and recouping toulenes, benzenes and such other harmful hydrocarbon gasses as may be generated by gradient force machine 22. Cupola 60 can include a charcoal filter for filtering out such contaminants or may include a water jet spray apparatus for the same function. If a water system is used, the gasses intermingled with the water could be separated out using a horizontal separator such as that indicated by the numeral 50.

The method for removing hydrocarbons from soil provided by Applicants includes the initial step of pulverizing hydrocarbon-containing soils to obtain pulverized soils. The consistency of the pulverized soils should be akin to that of granulated sugar or slightly finer. It is not desired that the pulverized soil should be as fine as flour. The pulverized soils are then mixed with release agents, as identified above, to obtain a light paste. Up to 2 ounces of release agent may be required for every 3 lbs. of contaminated soil depending on the amount of contamination present.

The light paste obtained by the blending of the pulverized soils with the released agents is passed to a water-filled separation unit where solid, water and hydrocarbon components are obtained. The solid component is then washed in a washing container with water such that a washed solid component is obtained. The hydrocarbons that have been released in the separation unit, and to a lesser extent in the washing container, are removed after having floated to the tops of the unit and container, respectively.

The above-described apparatus and method may be carried out at a contamination site due to the transportability and adaptability of the equipment and process. The use of Applicant's apparatus and method will save time and expense in regenerating contaminated soils to environmentally safe, usable and productive soils.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for removing hydrocarbons from soil, comprising:
  a. means for pulverizing hydrocarbon-containing soils and for breaking the surface tension of said hydrocarbons from said hydrocarbon-containing soils to obtain pulverized soils, said means also generating released hydrocarbon gases from said hydrocarbon-containing soils;
  b. means for capturing said released hydrocarbon gases;
  c. means for mixing the pulverized soils with release agents to obtain a paste;
  d. a water-filled separation unit for receiving the paste, the unit having a plurality of counter-rotating augers to aid in the breakdown of the paste to solid, water and hydrocarbon components, one of the augers being adapted to convey the solid component from the separation unit;
  e. a water-filled washing container for receiving the solid component from the separation unit, the container having a diagonally-disposed, enclosed auger for conveying the solid component through the water and from the container to obtain a washed solid component; and
  f. means for removing the hydrocarbons from the separation unit and the washing container, the hydrocarbons having floated to the top of the separation unit and the washing container.

2. An apparatus according to claim 1 wherein the means for pulverizing hydrocarbon-containing soils comprises a cyclonic comminuter/dehydrator.

3. An apparatus according to claim 1 wherein the pulverized soils are of a consistency akin to granulated sugar or finer.

4. An apparatus according to claim 1 wherein the separation unit has baffles placed above the augers for promoting removal of the hydrocarbons.

5. An apparatus according to claim 1 wherein the means for removing the hydrocarbons from the tops of the separation unit and the washing container comprises a vacuum system.

6. An apparatus according to claim 1, further comprising a dryer, the dryer adapted to receive the washed solid component from the washing container.

7. An apparatus according to claim 1, further comprising a surge tank adapted to receive removed hydrocarbons from the means for removing hydrocarbons.

8. An apparatus according to claim 7, further comprising a horizontal separator for further separating the solid, water and hydrocarbon components adapted to connect to the surge tank.

9. An apparatus according to claim 7, further comprising a horizontal separator for further separating the solid, water and hydrocarbon components adapted to connect to the surge tank and the washing container.

10. An apparatus according to claim 1, further comprising a horizontal separator for further separating the solid, water and hydrocarbon components adapted to connect to the washing container.

11. An apparatus for removing hydrocarbons from soil, comprising:
  a. a cyclonic comminuter/dehydrator for pulverizing hydrocarbon-containing soils to obtain pulverized soils, the machine having a cupola for capturing released hydrocarbon gases;
  b. a first elevator for conveying the pulverized soils from the machine;
  c. a mixing tank for receiving the pulverized soils from the first elevator, the mixing tank having an auger for blending the pulverized soils with release agents to obtain a light paste;
  d. a second elevator for conveying the paste from the mixing tank;
  e. a water-filled separation unit for receiving the paste from the second elevator, the unit having a plurality of counter-rotating augers to aid in the breakdown of the paste to solid, water and hydrocarbon components, one of the counter-rotating augers being adapted to convey the solid component from the separation unit;
  f. a water-filled washing container for receiving the solid component from the separation unit, the container having a diagonally-disposed, enclosed auger for conveying the solid component through the water and from the container to obtain a washed solid component;
  g. a vacuum means for removing the hydrocarbons from the separation unit and the washing container and transporting the hydrocarbons to a surge tank, the hydrocarbons having floated to the top of the separation unit and the washing container; and
  h. a dryer adapted to receive the washed solid component from the washing container and to substantially dry the washed solid component to obtain cleaned soil, the dryer having an output for discharging the cleaned soil.

12. An apparatus according to claim 11 wherein the separation unit has baffles placed above the augers for promoting removal of the hydrocarbons.

13. An apparatus according to claim 11, further comprising a gas pump and pipeline assembly for conveying captured hydrocarbon gases from the cupola to the dryer for use as fuel.

14. An apparatus according to claim 11, further comprising a horizontal separator for further separating the solid, water and hydrocarbon components adapted to connect to the surge tank.

15. An apparatus according to claim 11, further comprising a horizontal separator for further separating the solid, water and hydrocarbon components adapted to connect to the washing container.

16. An apparatus according to claim 11, further comprising a horizontal separator for further separating the solid, water and hydrocarbon components adapted to connect to the surge tank and the washing container.

17. An apparatus for removing hydrocarbons from soil, comprising:
   a. means for pulverizing hydrocarbon-containing soils and for breaking the surface tension of said hydrocarbons from said hydrocarbon-containing soils to obtain pulverized soils, said means also generating released hydrocarbon gases from said hydrocarbon-containing soils;
   b. means for capturing said released hydrocarbon gases;
   c. means for mixing the pulverized soils with release agents to obtain a paste;
   d. a water filled separation unit for receiving the paste, the unit having an auger to aid in the breakdown to solid, water and hydrocarbon components, the auger being adapted to convey the solid component from the separation unit;
   e. a water-filled washing container for receiving the solid component from the separation unit, the container having a diagonally-disposed, enclosed auger for conveying the solid component through the water and from the container to obtain a washed solid component; and
   f. means for removing the hydrocarbons from the separation unit and the washing container, the hydrocarbons having floated to the top of the separation unit and the washing container.

18. A method for removing hydrocarbons from soil, comprising:
   a. pulverizing hydrocarbon-containing soils with a cyclonic comminuter/dehydrator to break the surface tension of said hydrocarbons from said hydrocarbon-containing soils, to generate released hydrocarbon gases from said hydrocarbon-containing soils and to obtain pulverized soils;
   b. capturing said released hydrocarbon gases;
   c. mixing said pulverized soils with release agents to obtain a paste;
   d. transporting said paste to a water filled separation unit, the unit having an auger to aid in the breakdown to solid, water and hydrocarbon components, the auger being adapted to convey the solid component from the separation unit to a water-filled washing container for receiving the solid component from the separation unit, the container having a diagonally-disposed, enclosed auger for conveying the solid component through the water and from the container to obtain a washed solid component; and
   e. removing the hydrocarbons from the separation unit and the washing container, the hydrocarbons having floated to the top of the separation unit and the washing container.

19. A method of preparing hydrocarbon-containing soils for cleansing, comprising:
   a. collecting said hydrocarbon-containing soils;
   b. pulverizing said hydrocarbon-containing soils with a cyclonic comminuter/dehydrator to break the surface tension of said hydrocarbons from said hydrocarbon-containing soils, to generate released hydrocarbon gases from said hydrocarbon-containing soils and to obtain pulverized soils;
   c. capturing said released hydrocarbon gases for subsequent treatment or use; and
   d. collecting said pulverized soils for subsequent cleansing.

* * * * *

UNITED STATES PATENT AND TRADEMARK OFFICE
CERTIFICATE OF CORRECTION

PATENT NO. : 5,637,152
DATED : June 10, 1997
INVENTOR(S) : Forrest L. ROBINSON et al.

It is certified that error appears in the above-indentified patent and that said Letters Patent is hereby corrected as shown below:

Column 6, line 38 (line 5 of claim 11), delete "machine" and substitute therefor --cyclonic comminuter/dehydrator--; and Column 6, line 41 (line 8 of claim 11), delete "machine" and substitute therefor --cyclonic comminuter/dehydrator--.

Signed and Sealed this

Eighteenth Day of November 1997

Attest:

BRUCE LEHMAN

*Attesting Officer*    Commissioner of Patents and Trademarks